(12) United States Patent
Takemori (10) Patent No.: US 10,899,177 B2
(45) Date of Patent: Jan. 26, 2021

(54) PNEUMATIC TIRE (71) Applicant: The Yokohama Rubber Co., LTD., Tokyo (JP)

(72) Inventor: Ryohei Takemori, Hiratsuka (JP)

(73) Assignee: The Yokohama Rubber Co., LTD.

( * ) Notice: Subject to any disclaimer, the term of this patent is extended or adjusted under 35 U.S.C. 154(b) by 217 days.

(21) Appl. No.: 15/547,482

(22) PCT Filed: Jan. 28, 2016

(86) PCT No.: PCT/JP2016/052500
§ 371 (c)(1),
(2) Date: Jul. 28, 2017

(87) PCT Pub. No.: WO2016/121874
PCT Pub. Date: Aug. 4, 2016

(65) Prior Publication Data
US 2018/0022162 A1 Jan. 25, 2018

(30) Foreign Application Priority Data
Jan. 29, 2015 (JP) ................ 2015-015089

(51) Int. Cl.
*B60C 11/01* (2006.01)
*B60C 11/03* (2006.01)
*B60C 11/11* (2006.01)
*B60C 13/02* (2006.01)
(Continued)

(52) U.S. Cl.
CPC ........... *B60C 11/01* (2013.01); *B60C 11/0311* (2013.01); *B60C 11/11* (2013.01);
(Continued)

(58) Field of Classification Search
CPC ......... B60C 11/01; B60C 13/02; B60C 11/11; B60C 13/002; B60C 11/03
(Continued)

(56) References Cited

U.S. PATENT DOCUMENTS 5,571,351 A * 11/1996 Hatakenaka ............ B60C 11/01
152/209.16
5,605,588 A 2/1997 Hatakenaka et al.
(Continued)

FOREIGN PATENT DOCUMENTS

| CN | 101890883 | 11/2010 |
| JP | S55-160904 | 11/1980 |

(Continued)

OTHER PUBLICATIONS

International Search Report for International Application No. PCT/JP2016/052500 dated Apr. 26, 2016, 4 pages, Japan.

*Primary Examiner* — Robert C Dye
*Assistant Examiner* — Edgaredmanuel Troche
(74) *Attorney, Agent, or Firm* — Thorpe North & Western (57) ABSTRACT

A pneumatic tire is provided whereby superior driving performance on muddy ground, snowy roads, sandy land, and the like can be obtained. The pneumatic tire includes main grooves provided in shoulder regions of a tread portion and extending in a tire circumferential direction; a plurality of lug grooves extending outward in a tire width direction from the main grooves and reaching sidewall portions; and a plurality of blocks that is partitioned by the main grooves and the lug grooves. In this pneumatic tire, a raised portion protruding from the blocks is provided at an end portion on an outer side in the tire width direction of the blocks; and the raised portion extends in the tire circumferential direction so as to protrude into the lug grooves positioned on both sides of the raised portion.

8 Claims, 4 Drawing Sheets (51) Int. Cl.
*B60C 3/04* (2006.01)
*B60C 11/12* (2006.01)

(52) U.S. Cl.
CPC .............. *B60C 13/02* (2013.01); *B60C 3/04* (2013.01); *B60C 11/0306* (2013.01); *B60C 2011/0346* (2013.01); *B60C 2011/0381* (2013.01); *B60C 2011/1213* (2013.01)

(58) Field of Classification Search
USPC ................. 152/523, 209.16, 209.11
See application file for complete search history.

(56) References Cited

U.S. PATENT DOCUMENTS

| | | | | |
|---|---|---|---|---|
| 6,533,007 | B1* | 3/2003 | McMannis | B60C 11/01 152/209.16 |
| 6,920,906 | B2* | 7/2005 | Allison | B60C 11/01 152/209.16 |
| 8,056,592 | B2* | 11/2011 | Missik-Gaffney | B60C 11/0311 152/209.16 |
| 8,069,889 | B2* | 12/2011 | Sakamoto | B60C 13/02 152/209.11 |
| 8,079,391 | B2* | 12/2011 | Harvey | B60C 11/01 152/209.12 |
| 8,869,853 | B2* | 10/2014 | Kurosawa | B60C 13/02 152/523 |
| 2009/0107600 | A1 | 4/2009 | Missik-Gaffney et al. | |
| 2009/0159166 | A1 | 6/2009 | Sakamoto | |
| 2010/0000641 | A1* | 1/2010 | Morito | B60C 11/01 152/209.8 |
| 2010/0006196 | A1* | 1/2010 | Abe | B60C 11/01 152/209.16 |
| 2010/0043934 | A1 | 2/2010 | Harvey | |
| 2010/0288409 | A1 | 11/2010 | Ohara | |
| 2013/0025755 | A1* | 1/2013 | Nomura | B60C 11/01 152/209.16 |
| 2016/0129733 | A1* | 5/2016 | Fujioka | B60C 11/11 152/209.18 |

FOREIGN PATENT DOCUMENTS

| | | |
|---|---|---|
| JP | H06-344723 | 12/1994 |
| JP | H08-034206 | 2/1996 |

* cited by examiner

PNEUMATIC TIRE

TECHNICAL FIELD

The present technology relates to a pneumatic tire, and particularly relates to a pneumatic tire whereby superior driving performance on muddy ground, snowy roads, sandy land, and the like can be obtained.

BACKGROUND ART

Typically, a tread pattern based on lug grooves with many edge components, for which groove area and groove depth is great is used for pneumatic tires to be used for traveling on muddy ground, snowy roads, sandy land, and the like (hereinafter referred to as "muddy ground and the like"). Such tires seek to bite into the mud, snow, sand, or the like (hereinafter referred to as "mud and the like") on the road surface to obtain traction performance and also prevent mud and the like from forming a clog in the grooves (improve discharging performance of mud and the like) in order to improve driving performance (mud performance) on muddy ground and the like (e.g. see Japanese Unexamined Patent Application Publication No. 2011-183884A).

The technology described in Japanese Unexamined Patent Application Publication No. 2011-183884A calls particular attention to the sinking in of a region from the shoulder portion to the sidewall portion in mud and the like when traveling on muddy ground and the like, and describes opening a lug groove extending outward in the tire width direction in the shoulder portion past the shoulder portion and up to the sidewall portion, and also increasing the groove width of this lug groove as going outward in the tire width direction. With such a tire, mud performance can be further improved when traveling on muddy ground and the like due to the lug groove extending outward in the tire width direction past the shoulder portion.

However, with lug grooves shaped in this manner, discharge performance of mud and the like is obtained by increasing the groove width as going outward in the tire width direction. As such, it is more difficult for mud and the like to be compacted in the lug grooves, which leads to a problem of traction characteristics, which are generated by shear force against the mud and the like compacted in the lug groove, being insufficient. Consequently, there is a problem in that high traction characteristics cannot be obtained in cases where rapid take off is required, and particularly, in situations such as when the tire has gotten into deep muddy ground and the like.

SUMMARY

The present technology relates to a pneumatic tire whereby superior driving performance on muddy ground, snowy roads, sandy land, and the like can be obtained.

A pneumatic tire of the present technology includes a tread portion extending in a tire circumferential direction to form an annular shape; a pair of sidewall portions disposed on both sides of the tread portion; a pair of bead portions disposed inward in a tire radial direction of the sidewall portions; main grooves disposed in shoulder regions of the tread portion and extending in the tire circumferential direction; a plurality of lug grooves extending outward in a tire width direction from the main grooves and reaching the sidewall portions; and a plurality of blocks partitioned by the main grooves and the lug grooves. In such a pneumatic tire, a raised portion protruding from the blocks is provided at an end portion outward in the tire width direction of the blocks; and the raised portion extends in the tire circumferential direction so as to protrude into lug grooves positioned on both sides of the raised portion.

In the present technology, not only is mud and the like bit into by the lug grooves reaching from the main grooves disposed in the shoulder regions to the sidewall portions, but the mud and the like can also be trapped by the raised portion that is provided outward in the tire width direction from the blocks in the shoulder region and that is protruding from the blocks. As a result, superior traction characteristics can be obtained. Additionally, the groove width of the lug grooves is narrowed due to the raised portion protruding into the lug grooves positioned on both sides of the raised portion. As a result, it is easier to compact mud and the like gotten into the lug grooves, and traction characteristics based on shear force against compacted mud and the like can be satisfactorily obtained.

In the present technology, it is preferable that a pair of the raised portions protruding into a same lug groove is disposed such that phases in the tire width direction in the same lug groove differ from each other. By configuring the protruding positions into the lug groove of the pair of raised portions that protrude into the same lug groove to differ in the tire width direction, sudden narrowing of the groove width can be avoided and discharging performance of mud and the like can be obtained, and mud and the like gotten into the lug groove can be effectively compacted.

In the present technology, it is preferable that a ratio A/H of a vertical distance A measured in the tire radial direction from a ground contact edge position of the tread portion to the raised portion, to a tire cross-sectional height H is from 0.15 to 0.30. Configuring the position of the raised portion in this manner results in the raised portion reliably trapping mud and the like when traveling on muddy ground and the like, which is advantageous from the perspective of increasing traction characteristics.

In the present technology, it is preferable that at least one cavity for which surroundings are obstructed is provided in the blocks. By providing such a cavity, mud and the like will be trapped by the cavity and, also, the mud and the like in the cavity can be compacted. As such, traction characteristics can be further improved.

Here, it is preferable that a ratio B/H of a vertical distance B measured in the tire radial direction from the ground contact edge position of the tread portion to the cavity, to the tire cross-sectional height H is from 0.05 to 0.15. Disposing the cavity at this position results in the cavity reliably trapping mud and the like when traveling on muddy ground and the like, which is advantageous from the perspective of increasing traction characteristics.

In the present technology, the "ground contact edge" is the edge portion in the tire axial direction when the tire is mounted on a regular rim and inflated to an air pressure of 230 kPa, and placed vertically upon a flat surface with 60% of a regular load applied thereto. "Regular rim" is a rim defined by a standard for each tire according to a system of standards that includes standards on which tires are based, and refers to a "standard rim" in the case of Japan Automobile Tyre Manufacturers Association (JATMA), refers to a "design rim" in the case of Tire and Rim Association (TRA), and refers to a "measuring rim" in the case of European Tyre and Rim Technical Organisation (ETRTO). "Regular load" is a load defined by a standard for each tire according to a system of standards that includes standards on which tires are based, and refers to a "maximum load capacity" in the case of JATMA, to the maximum value in the table of "TIRE ROAD LIMITS AT VARIOUS COLD INFLATION PRESSURES" in the case of TRA, and to "LOAD CAPACITY" in the case of ETRTO.

DETAILED DESCRIPTION

The configuration of the present technology is described below in detail with reference to the accompanying drawings.

Figure 1:
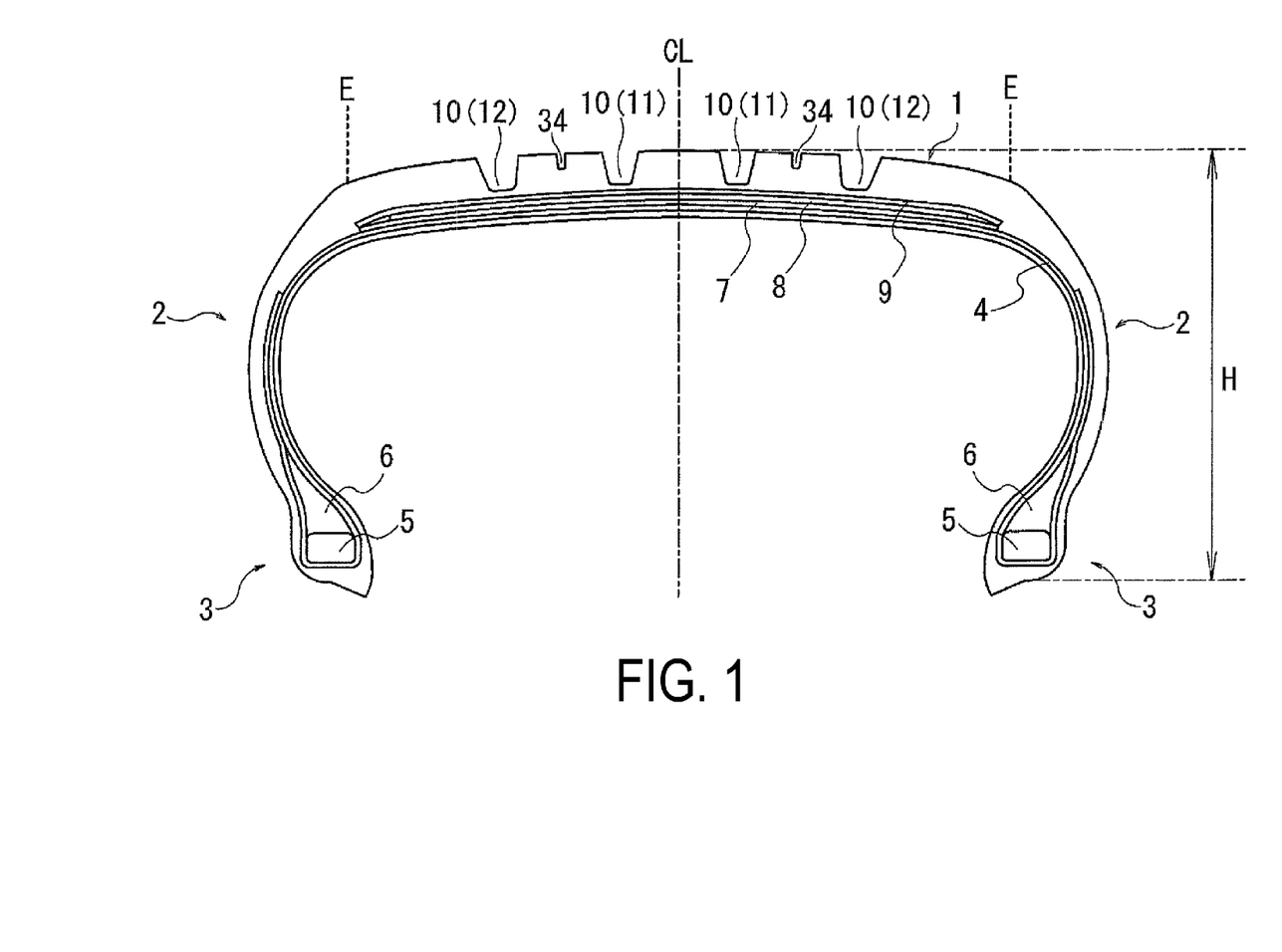
FIG. 1 is a meridian cross-sectional view of a pneumatic tire according to an embodiment of the present technology.

Reference sign CL in FIG. 1 denotes the tire equator. The pneumatic tire of the present technology includes a tread portion 1 extending in a tire circumferential direction to form a ring shape, a pair of sidewall portions 2 disposed on both sides of the tread portion 1, and a pair of bead portions 3 disposed inward in a tire radial direction of the sidewall portions 2. One layer of a carcass layer 4 is disposed extending between the left and right pair of bead portions 3. The carcass layer 4 includes a plurality of reinforcing cords extending in the tire radial direction, and is folded back around a bead core 5 disposed in each bead portion 3 from a vehicle inner side to a vehicle outer side. Additionally, bead fillers 6 are disposed on the periphery of the bead cores 5, and each bead filler 6 is enveloped by a main body portion and a folded back portion of the carcass layer 4. In the tread portion 1, a plurality of belt layers 7 and 8 (two layers in FIG. 1) are embedded on the outer circumferential side of the carcass layer 4. Each of the belt layers 7 and 8 includes a plurality of reinforcing cords inclined with respect to the tire circumferential direction, and these reinforcing cords are arranged so that the cords of different layers intersect each other. In the belt layers 7 and 8, an inclination angle of the reinforcing cords with respect to the tire circumferential direction is set in a range of, for example, 10° to 40°. Additionally, a belt reinforcing layer 9 is disposed on the outer circumferential side of the belt layer 7. The belt reinforcing layer 9 includes organic fiber cords oriented in the tire circumferential direction. In the belt reinforcing layer 9, an angle of the organic fiber cords with respect to the tire circumferential direction is set to, for example, 0° to 5°.

The present technology is applied to such a general pneumatic tire, however, the cross-sectional structure thereof is not limited to the basic structure described above.

Figure 2:
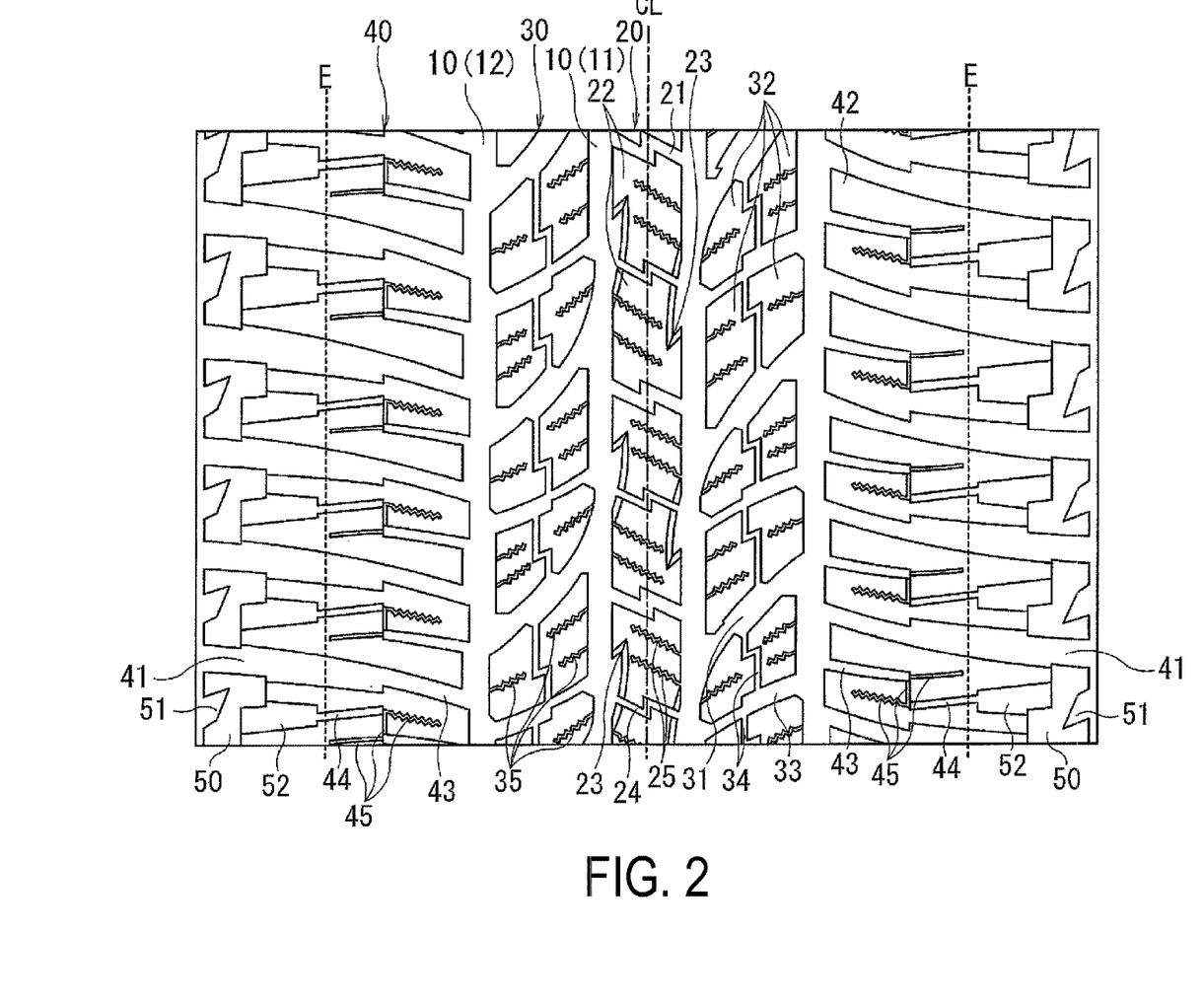
FIG. 2 is a front view illustrating a tread surface of a pneumatic tire according to an embodiment of the present technology.

Four main grooves 10 extending in the tire circumferential direction are formed in the tread portion 1 of the embodiment illustrated in FIG. 2. Of these four main grooves 10, the main grooves 10 disposed on the tire equator CL side on both sides in the tire width direction of the tire equator CL are defined as inner main grooves 11, and the main grooves 10 disposed outward in the tire width direction (on the shoulder portion side) of the inner main grooves 11 are defined as outer main grooves 12.

Five rows of land portions extending in the tire circumferential direction are partitioned in the tread portion 1 by these four main grooves 10. Of these five land portions, the land portion partitioned between the two inner main grooves 11 is defined as a central land portion 20, the land portions partitioned between each of the inner main grooves 11 and the outer main grooves 12 are defined as intermediate land portions 30, and the land portions partitioned outward in the tire width direction from the outer main grooves 12 are defined as shoulder land portions 40.

A plurality of central lug grooves 21 is provided in the central land portion 20, spaced in the tire circumferential direction. The plurality of central lug grooves 21 communicate with the inner main grooves 11 on both sides of the central land portion 20. Each of the central lug grooves 21 has a zigzag shape, and is configured from a first portion extending in the tire circumferential direction, a second portion extending from a first end of the first portion toward the main groove on a first side in the tire width direction, and a third portion extending from a second end of the first portion toward the main groove on a second side in the tire width direction. Here, the first portion extending in the tire circumferential direction of each central lug groove 21 is positioned on the tire equator CL. Additionally, the second and third portions extending in the tire width direction of each central lug groove 21 are both inclined in the same direction with respect to the tire width direction, and inclination angles of the second and third portions are identical.

Thus, the central land portion 20 is divided by the central lug grooves 21 into a plurality of central blocks 22 arranged in the tire circumferential direction. A recessed portion 23 is formed in wall surfaces (wall surfaces facing the inner main grooves 11) on both sides in the tire width direction of each central block 22. Each recessed portion 23 has a V-shaped form, notched toward the tire equator CL side. A chamfer is formed at a connecting portion of the wall surface of each recessed portion 23 with a top surface of the central block 22. A central auxiliary groove 24 connecting the two recessed portions 23 formed in each central block 22 is formed between these two recessed portions 23. Each central auxiliary groove 24 opens to a midsection of the wall surface leading to the apex of the V-shaped recessed portion 23. Additionally, each central auxiliary groove 24 has a bent shape similar to that of the central lug grooves 21. Specifically, while the central auxiliary grooves 24 are inclined in the same direction as the central lug grooves 21, a groove width of the central lug grooves 21 is smaller than a groove width of the central auxiliary grooves 24.

A plurality of sipes 25 extending in the tire width direction is provided in each portion of the central blocks 22 that are divided by the central auxiliary grooves 24. These sipes 25 have a zigzag shape in the top surface of the central blocks 22. Additionally, each sipe 25 is configured such that a first end communicates with the inner main groove 11, and a second end terminates near the tip of the V-shaped recessed portion 23 described above.

Pluralities of intermediate lug grooves 31 extending in the tire width direction and spaced in the tire circumferential direction are provided in the intermediate land portions 30. Each intermediate lug groove 31 is inclined with respect to the tire width direction and is curved in an arc shape convex to the tire equator CL side. Note that the groove width of each intermediate lug groove 31 need not be constant and, as illustrated in the drawings, the groove width may change in a step-like manner.

The intermediate land portions 30 are divided by the intermediate lug grooves 31 into pluralities of intermediate blocks 32 arranged in the tire circumferential direction. Each intermediate block 32 is further partitioned by an intermediate auxiliary groove 33 extending in the tire width direction and a circumferential auxiliary groove 34 extending in the tire circumferential direction. The groove width of the intermediate auxiliary groove 33 changes at a central portion in the width direction of the intermediate block 32 and includes a broad width portion and a narrow width portion. The circumferential auxiliary groove 34 has a zigzag shape and communicates with the broad width portion of the intermediate auxiliary groove 33 and the intermediate lug groove 31. A wall surface (wall surface facing the main groove) of each portion of the intermediate block 32, which is divided by the intermediate auxiliary groove 33 and the circumferential auxiliary groove 34, is offset in the tire width direction for each portion, and is configured such that, when viewed in the tire circumferential direction, unevennesses repeat in a groove wall surface on the intermediate land portion 30 side of each main groove.

At least one sipe 35 is provided in each portion of the intermediate block 32, which is divided by the intermediate auxiliary groove 33 and the circumferential auxiliary groove 34. Each sipe 35 has a zigzag shape in the block top surface. A first end of the sipes 35 opens to the inner main groove 11 or the outer main groove 12, and a second end thereof terminates within the intermediate block 32 (within each divided portion of the intermediate block 32).

Note that, in the example illustrated in the drawings, the V-shaped recessed portions 23 formed in the central land portions 20 described above are configured so as to match an acute portion formed by connecting an extension line of the intermediate lug groove 31 and an extension line of the intermediate auxiliary groove 33 formed in the intermediate land portion 30.

Pluralities of shoulder lug grooves 41 extending in the tire width direction and spaced in the tire circumferential direction are provided in the shoulder land portions 40. The shoulder lug grooves 41 extend outward in the tire width direction from the outer main grooves 12 and reach the sidewall portions. The shoulder lug grooves 41 are configured such that a groove width thereof gradually increases outward in the tire width direction. Note that, in the example illustrated in the drawings, each shoulder lug groove 41 includes one portion where the groove width increases in a step-like manner, in a region (ground contact region) inward in the tire width direction of a ground contact edge E.

The shoulder land portions are divided by these pluralities of shoulder lug grooves 41 into pluralities of shoulder blocks 42 arranged in the tire circumferential direction. Two types of shoulder auxiliary grooves (a first shoulder auxiliary groove 43 and a second shoulder auxiliary groove 44) extending in the tire width direction are formed in each shoulder block 42. The first shoulder auxiliary groove 43 has a shape in which a first end communicates with the outer main groove 12 and a second end terminates within the shoulder block 42. The second shoulder auxiliary groove 44 has a shape in which a first end terminates within the shoulder block 42 and a second end extends past the ground contact edge E. The groove wall surfaces facing the outer main groove 12 of the portions of the shoulder block 42, which is divided by the first shoulder auxiliary groove 43, are offset in the tire width direction.

Terminating positions within the shoulder block 42 of the first shoulder auxiliary groove 43 and the second shoulder auxiliary groove 44 are aligned in the tire width direction, and these terminating ends are connected by a sipe 45 extending in a straight line in the tire circumferential direction. Furthermore, a straight line shaped sipe 45 extending from the terminating end of the first shoulder auxiliary groove 43 along an extending direction of the first shoulder auxiliary groove 43, and a zigzag shaped sipe 45 extending from the terminating end of the second shoulder auxiliary groove 44 along the extending direction of the second shoulder auxiliary groove 44 are provided in the shoulder block 42. Note that the sipe 45 extending from the terminating end of the first shoulder auxiliary groove 43 terminates inward in the tire width direction of the ground contact edge E.

In the example illustrated in the drawings, when forming the lug grooves (the central lug grooves 21, the intermediate lug grooves 31, and the shoulder lug grooves 41) in the land portions (the central land portion 20, the intermediate land portions 30, and the shoulder land portions 40) as described above, the lug grooves are configured such that the inclination directions of the lug grooves (the central lug grooves 21, the intermediate lug grooves 31, and the shoulder lug grooves 41) formed in adjacent land portions are opposite each other.

The structure of the tread pattern illustrated in FIG. 2 was described above. However, the present technology primarily specifies the structure of the region outward in the tire width direction from the ground contact edge E (described below). As such, provided that the tread pattern is partitioned by the outer main grooves 12 and the shoulder lug grooves 41 into shoulder blocks 42 as described above, the structure (tread pattern) of other portions within the ground contact region is not limited to the embodiment illustrated in FIG. 2.

Figure 3:
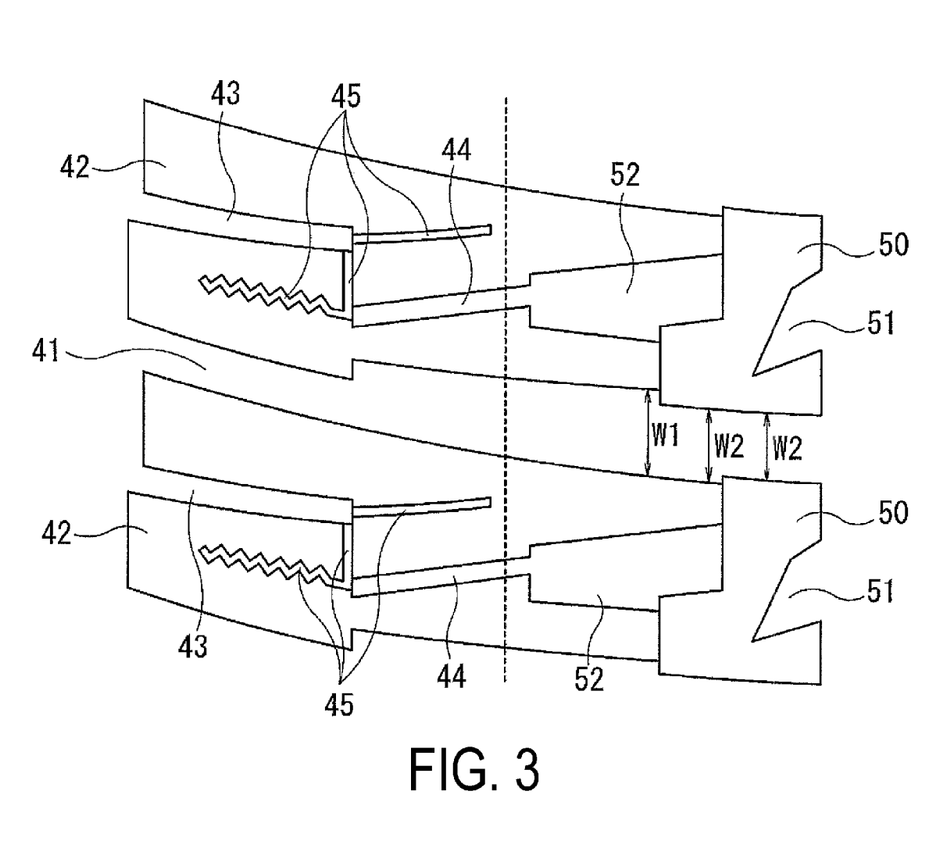
FIG. 3 is an enlarged front view illustrating a shoulder portion of a pneumatic tire according to the present technology.
Figure 4:
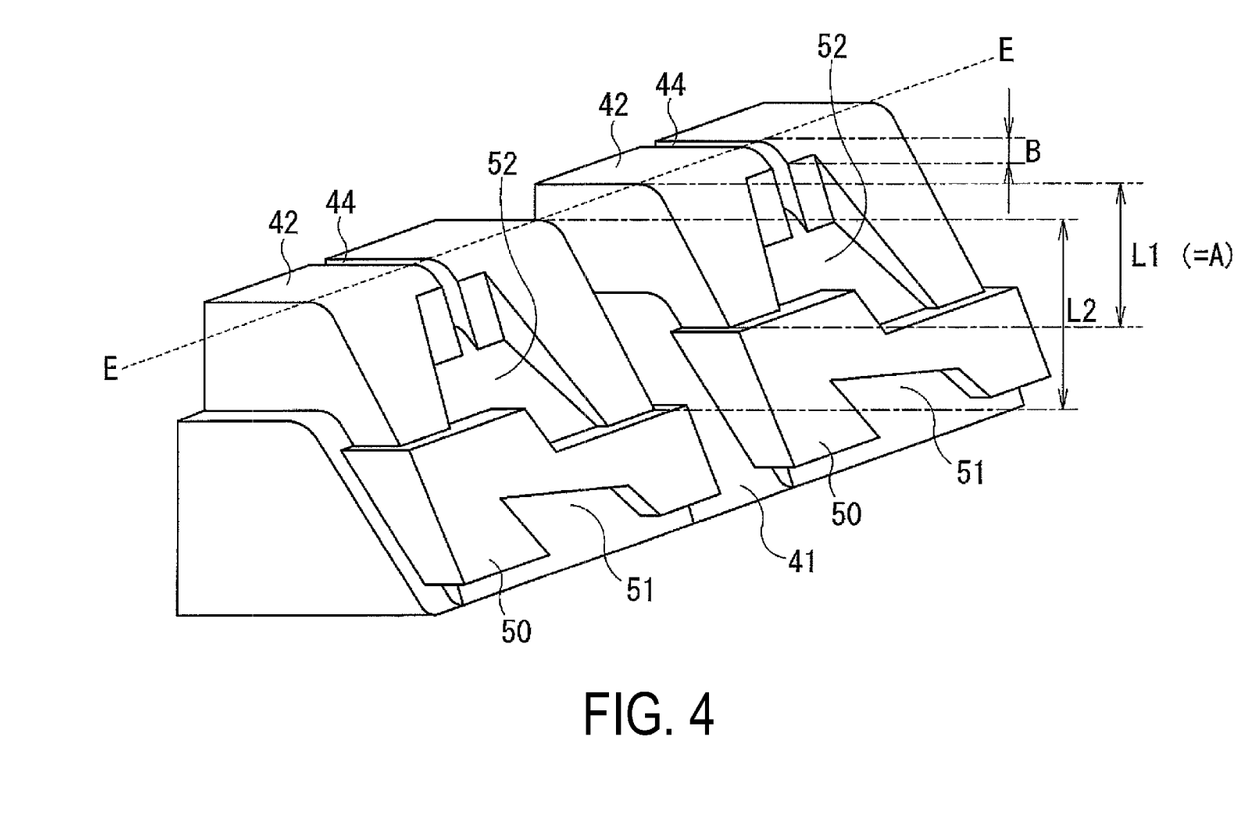
FIG. 4 is an enlarged perspective view illustrating a shoulder portion of a pneumatic tire according to the present technology.

As enlarged and illustrated in FIGS. 3 and 4, in the present technology, a raised portion 50 protruding from the shoulder block 42 is provided at an end portion outward in the tire width direction of the shoulder blocks 42. This raised portion 50 extends in the tire circumferential direction so as to protrude into the shoulder lug grooves 41 positioned on both sides in the tire circumferential direction of the raised portion 50. Specifically, in the embodiment illustrated in FIGS. 3 and 4, the raised portion 50 has an L-shape having a recessed portion in a side outward in the tire width direction. Additionally, a tire circumferential direction length of the raised portion 50 is greater than that of the shoulder block 42, and both end portions in the tire circumferential direction of the raised portion 50 protrude farther into the shoulder lug grooves 41 than both wall surfaces in the tire circumferential direction of the shoulder block 42.

Due to such a raised portion 50 being provided, in the pneumatic tire of the present technology, not only do the shoulder lug grooves 41 reaching from the outer main grooves 12 to the sidewall portions 2 bite into mud and the like, but the mud and the like can also be trapped by the raised portion 50. As a result, superior traction characteristics can be obtained. Additionally, the groove width of the shoulder lug grooves 41 is narrowed due to the raised portion 50 protruding into the shoulder lug grooves 41 positioned on both sides of the raised portion 50. As a result, mud and the like in the shoulder lug grooves 41 can be compacted easier, and sufficient traction characteristics based on shear force against compacted mud and the like can be sufficiently obtained.

Particularly, due to the fact that the raised portion 50 has an L-shape having the recessed portion 51 such as that illustrated in the drawings, mud and the like can be can be more easily trapped by the portion that is bent in the L-shape and by the recessed portion 51, which is advantageous from the perspective of improving traction characteristics.

Here, it is preferable that a groove width ration W2/W1 is in a range of 0.5 to 0.8, where W1 is a maximum groove width of a portion of one shoulder lug groove 41 where the groove width is not narrowed by the raised portion 50, and W2 is a groove width of a portion where the groove width is narrowed by the raised portion 50. By configuring the groove width of the shoulder lug groove 41 in this manner, both discharging performance for discharging mud and the like in the grooves, and traction characteristics by the raised portion 50 can be obtained in a highly compatible manner. If the ratio W2/W1 is less than 0.5, the groove width at the portion outermost in the tire width direction of the shoulder lug groove 41 will be excessively small and, as a result, discharging performance of mud and the like will decline. If the ratio W2/W1 is greater than 0.8, the protruding amount of the raised portion 50 into the shoulder lug grooves 41 will be excessively small and, as a result, it will be difficult to sufficiently obtain traction characteristics based on shear force against compacted mud and the like in the grooves. Note that, in the example illustrated in the drawings, the groove width narrows in a step-like manner (in two steps in the example illustrated in the drawings), but it is preferable that the groove width ratio described above is satisfied in all portions where the groove width is narrowed.

Due to the raised portion 50 having an L-shape as described above, the pair of raised portions 50 protruding into the same shoulder lug groove 41 will have phases in the tire width direction, within the shoulder lug groove 41, that differ from each other. By configuring the protruding positions into the shoulder lug groove 41 of the pair of raised portions 50 that protrude into the same lug groove to differ in the tire width direction, sudden narrowing of the groove width can be avoided and discharging performance of mud and the like can be obtained, and ease of compacting of mud and the like gotten into the shoulder lug groove 41 can be ensured.

Particularly, it is preferable that a distance ratio L1/L2 is in a range of 0.5 to 0.8, where L1 is a vertical distance from the ground contact edge E to the protruding portion of the pair of raised portions 50 closer to the ground contact edge E, and L2 is a vertical distance from the ground contact edge E to the protruding portion of the pair of raised portions 50 farther from the ground contact edge E. Here, if the ratio L1/L2 is less than 0.5, the phase difference in the tire width direction of the protruding positions will be excessively small and, as a result, it will be difficult to sufficiently obtain traction characteristics based on shear force against compacted mud and the like in the grooves. If the ratio L1/L2 is greater than 0.8, the overall groove width of the shoulder lug groove 41 will be narrowed by at least one of the pair of raised portions 50 and, as a result, it will be difficult to ensure discharging performance of mud and the like.

The raised portion 50 is disposed outward in the tire width direction from the shoulder land portion 40, but it is preferable that a ratio A/H of a vertical distance A from the ground contact edge E position thereof to a tire cross-sectional height H is in a range of 0.15 to 0.30. Configuring the position of the raised portion 50 in this manner results in the raised portion 50 reliably trapping mud and the like when traveling on muddy ground and the like, which is advantageous from the perspective of increasing traction characteristics. Here, if the ratio A/H is less than 0.15, the raised portion 50 will be excessively close to the ground contact edge E and, as a result, it will be difficult to sufficiently obtain discharging performance of mud and the like. If the ratio A/H is greater than 0.30, the raised portion 50 will be excessively separated from the ground contact edge E and, as a result, it will be difficult to sufficiently compact mud and the like in the grooves and, therefore, it will be difficult to sufficiently obtain traction characteristics based on shear force against compacted mud and the like.

As illustrated in FIGS. 3 and 4, in the present technology, it is preferable that at least one cavity 52 for which surroundings are obstructed is provided in the blocks. In the example illustrated in the drawings, the cavity 52 has a trapezoidal shape that has a notch (the part where a portion of the L-shape of the raised portion 50 protruding to the tire equator CL side overlaps). By providing such a cavity 52, mud and the like will be trapped by the cavity 52 and, also, the mud and the like gotten into the cavity 52 can be compacted. As such, traction characteristics can be further improved. Note that, in the example illustrated in the drawings, the second shoulder auxiliary groove 44 communicates with the cavity 52, but the groove width and groove depth of the second shoulder auxiliary groove 44 are sufficiently less than those of the lug grooves (the shoulder lug grooves 41). As such, the surroundings of the cavity 52 can be considered to be substantially obstructed.

A depth of this cavity 52 is not particularly limited, but if excessively deep, the rigidity of the shoulder blocks 42 will decline. As such, it is preferable that the depth of the cavity 52 be shallower than the depth at the same position in the tire width direction of the shoulder lug groove 41 adjacent in the tire circumferential direction to the cavity 52. Particularly, it is preferable that a maximum depth D1 of the cavity 52 is from 0.5 to 0.8 times a groove depth Da of the shoulder lug groove 41 at a position in the tire width direction where the cavity 52 reaches the maximum depth D1. Here, if the maximum depth D1 of the cavity 52 is less than 0.5 times the groove depth Da at the position of the shoulder lug groove 41 described above, the cavity 52 will be excessively shallow and, as a result, mud and the like will not be sufficiently trapped and it will be more difficult to increase traction performance. If the maximum depth D1 of the cavity 52 is greater than 0.8 times the groove depth Da at the position of the shoulder lug groove 41 described above, the surroundings of the cavity 52 will be obstructed and the cavity 52 will be isolated from the other grooves. As a result, mud and the like will become a clog more easily.

It is preferable that the cavity 52 is disposed outward in the tire width direction from the ground contact edge E because the cavity 52 will effectively function when the tire enters mud and the like without affecting tire performance during normal travel. Particularly, it is preferable that a ratio B/H of a vertical distance B measured in the tire radial direction from the ground contact edge E position of the tread portion to the cavity 52, to the tire cross-sectional height H is in a range of 0.05 to 0.15. Disposing the cavity 52 at this position results in the cavity 52 reliably trapping mud and the like when traveling on muddy ground and the like, which is advantageous from the perspective of increasing traction characteristics. Here, if the ratio B/H is less than 0.05, the cavity 52 will be excessively close to the ground contact edge E and, as a result, rigidity of the portion of the shoulder block 42 within the ground contact region will decline. If the ratio B/H exceeds 0.15, the cavity 52 will be excessively far from the ground contact edge E and, as a result, the advantageous effects of the cavity 52 may not be sufficiently obtained.

The description given above focused on mud performance when traveling on muddy ground and the like as an advantageous effect of the present technology. However, the same actions will be demonstrated for snow when traveling on snowy roads (instead of mud on muddy ground), and driving performance (snow performance) on snow-covered road surfaces can be obtained.

EXAMPLES

Fifteen types of pneumatic tires for Conventional Example 1, Comparative Example 1, and Examples 1 to 13 were fabricated. For each pneumatic tire, the tire size was 265/65R17 112H, the reinforcement structure illustrated in FIG. 1 was included, and the tread pattern within the ground contact region included the structure illustrated in FIG. 2. The presence/absence of the raised portion; the ratio A/H of the vertical distance from the ground contact edge to the raised portion, to the tire cross-sectional height; the ratio L1/L2 of the vertical distance L1 to the raised portion closer to the ground contact edge of the pair of raised portions protruding into the same shoulder lug groove, to the vertical distance L2 to the raised portion farther from the ground contact edge of the pair of raised portions protruding into the same shoulder lug groove; the ratio W2/W1 of the maximum width W1 of the shoulder lug groove to the groove width W2 at the portion where the groove width is narrowed by the raised portion; the presence/absence of the cavity; the ratio B/H of the vertical distance from the ground contact edge to the cavity, to the tire cross-sectional height; and the ratio D1/Da of the depth of the cavity to the groove depth of the shoulder lug groove were configured as shown in Tables 1 and 2.

In these pneumatic tires, the shapes of the raised portion and the cavity were held in common and were basically the shapes illustrated in FIGS. 2 and 3. However, in Comparative Example 1, the raised portion did not protrude into the shoulder lug grooves (as such, the groove width ratio W2/W1 was 1.0), and in Example 8, the positions in the tire width direction of the pair of raised portions protruding into the same shoulder lug groove were aligned (that is, the raised portion was a rectangle in which the portion of the L-shape protruding to the tire equator CL side in the drawings did not exist).

Additionally, in Conventional Example 1 that did not include the raised portion, the shoulder block extended to the outer end position in the tire width direction of the raised portion in FIG. 2. In Conventional Example 1 and Example 9 that did not include the cavity, the second shoulder auxiliary groove extended to the end portion of the shoulder block (to the boundary position between the shoulder block and the raised portion in cases where the raised portion was provided).

Regarding the groove width W2, in the examples illustrated in FIGS. 2 and 3, the groove width of the shoulder lug grooves is narrowed in two steps by the raised portion, but the groove width W2 was measured at the portion where the groove width was narrowest (the opening end outward in the tire width direction of the shoulder lug groove).

These 15 types of pneumatic tires were evaluated for mud ride feeling and take off performance on deep muddy road surfaces by the evaluation methods described below, and the results are also shown in Tables 1 and 2.

Mud Ride Feeling

Each test tire was mounted on a wheel with a rim size of 17×8J, inflated to an air pressure of 230 kPa, and mounted on a four-wheel drive vehicle with an engine displacement of 3.5 L. Then, test driving was carried out by a test driver on a mud course (mud depth: from 10 mm to 20 mm), and driving performance at this time was sensory evaluated. Evaluation results were expressed as index values, with Conventional Example 1 being assigned a reference index value of 100. Larger index values indicate superior mud ride feeling.

Take Off Performance on Deep Muddy Road Surfaces

Each test tire was mounted on a wheel with a rim size of 17×8J, inflated to an air pressure of 230 kPa, and mounted on a four-wheel drive vehicle with an engine displacement of 3.5 L. Then, test driving was carried out by a test driver on a deep muddy road surface (mud depth: from 100 mm to 200 mm), and take off performance at this time was sensory evaluated. Evaluation results were expressed as index values, with Conventional Example 1 being assigned an index value of 100. Larger index values indicate superior take off performance on deep muddy road surfaces.

TABLE 1

| | | Conventional example 1 | Example 1 | Example 2 | Example 3 |
|---|---|---|---|---|---|
| Raised portion | Presence/absence | Absent | Present | Present | Present |
| | Vertical distance A/H from ground contact edge | — | 0.20 | 0.20 | 0.20 |
| | Distance ratio L1/L2 | — | 0.75 | 0.75 | 0.75 |
| | Groove width ratio W2/W1 | — | 0.75 | 0.5 | 0.8 |
| Cavity | Presence/absence | — | Present | Present | Present |
| | Vertical distance B/H from ground contact edge | — | 0.10 | 0.10 | 0.10 |
| | Depth D1/Da | — | 0.75 | 0.75 | 0.75 |
| Mud ride feeling | Index value | 100 | 105 | 105 | 105 |
| Take off performance on deep muddy road surfaces | Index value | 100 | 105 | 104 | 104 |

| | | Comparative example 1 | Example 4 | Example 5 |
|---|---|---|---|---|
| Raised portion | Presence/absence | Present | Present | Present |
| | Vertical distance A/H from ground contact edge | 0.20 | 0.15 | 0.30 |
| | Distance ratio L1/L2 | 0.75 | 0.75 | 0.75 |
| | Groove width ratio W2/W1 | 1.0 | 0.75 | 0.75 |
| Cavity | Presence/absence | Present | Present | Present |
| | Vertical distance B/H from ground contact edge | 0.10 | 0.10 | 0.10 |
| | Depth D1/Da | 0.75 | 0.75 | 0.75 |
| Mud ride feeling | Index value | 101 | 105 | 105 |

TABLE 1-continued

| | | | | |
|---|---|---|---|---|
| Take off performance on deep muddy road surfaces | Index value | 101 | 103 | 103 |

TABLE 2

| | | Example 6 | Example 7 | Example 8 | Example 9 |
|---|---|---|---|---|---|
| Raised portion | Presence/absence | Present | Present | Present | Present |
| | Vertical distance A/H from ground contact edge | 0.20 | 0.20 | 0.20 | 0.20 |
| | Distance ratio L1/L2 | 0.5 | 0.8 | 1.0 | 0.75 |
| | Groove width ratio W2/W1 | 0.75 | 0.75 | 0.75 | 0.50 |
| Cavity | Presence/absence | Present | Present | Present | Absent |
| | Vertical distance B/H from ground contact edge | 0.10 | 0.10 | 0.10 | — |
| | Depth D1/Da | 0.75 | 0.75 | 0.75 | — |
| Mud ride feeling | Index value | 105 | 105 | 105 | 103 |
| Take off performance on deep muddy road surfaces | Index value | 104 | 104 | 103 | 103 |

| | | Example 10 | Example 11 | Example 12 | Example 13 |
|---|---|---|---|---|---|
| Raised portion | Presence/absence | Present | Present | Present | Present |
| | Vertical distance A/H from ground contact edge | 0.20 | 0.20 | 0.20 | 0.20 |
| | Distance ratio L1/L2 | 0.75 | 0.75 | 0.75 | 0.75 |
| | Groove width ratio W2/W1 | 0.80 | 0.75 | 0.75 | 0.75 |
| Cavity | Presence/absence | Present | Present | Present | Present |
| | Vertical distance B/H from ground contact edge | 0.05 | 0.15 | 0.10 | 0.10 |
| | Depth D1/Da | 0.75 | 0.75 | 0.5 | 0.8 |
| Mud ride feeling | Index value | 105 | 105 | 103 | 103 |
| Take off performance on deep muddy road surfaces | Index value | 103 | 103 | 103 | 103 |

As clear from Tables 1 and 2, mud ride feeling and take off performance on deep muddy road surfaces improved in each of Examples 1 to 13 compared to Conventional Example 1. On the other hand, with Comparative Example 1 that included the raised portion, but the raised portion did not protrude into the shoulder lug grooves, mud gotten into the shoulder lug grooves could not be sufficiently compacted and, as a result, the performance factors could not be sufficiently improved.

The invention claimed is:

1. A pneumatic tire, comprising:
a tread portion extending in a tire circumferential direction to form an annular shape;
a pair of sidewall portions disposed on both sides of the tread portion;
a pair of bead portions disposed inward in a tire radial direction of the sidewall portions;
main grooves disposed in shoulder regions of the tread portion and extending in the tire circumferential direction;
a plurality of lug grooves extending outward in a tire width direction from the main grooves and reaching the sidewall portions; and
a plurality of blocks partitioned by the main grooves and the lug grooves; wherein
a raised portion protruding from the blocks is provided at an end portion outward in the tire width direction of the blocks;
the raised portion extends in the tire circumferential direction so as to protrude into lug grooves positioned on both sides of the raised portion;
the raised portion has a height raised from a height of the blocks;
the raised portion includes a pair of protruding portions including one portion closer to a ground contact edge and bordering one of the lug grooves and another protruding portion farther away from the ground contact edge and bordering another one of the lug grooves;
the raised portion has a length in the circumferential direction between the lug grooves greater than a length of the blocks in the circumferential direction between the lug grooves;
at least one cavity for which surroundings are obstructed is provided in the blocks; and
the at least one cavity opens to a main groove via other lug grooves.

2. The pneumatic tire according to claim 1, wherein:
a pair of the raised portions protruding into a same lug groove is disposed such that phases in the tire width direction in the same lug groove differ from each other.

3. The pneumatic tire according to claim 1, wherein:
a ratio A/H of a vertical distance A measured in the tire radial direction from a ground contact edge position of the tread portion to the raised portion, to a tire cross-sectional height H is from 0.15 to 0.30.

4. The pneumatic tire according to claim 1, wherein:
a ratio B/H of a vertical distance B measured in the tire radial direction from a ground contact edge position of the tread portion to the cavity, to a tire cross-sectional height H is from 0.05 to 0.15.

5. The pneumatic tire according to claim 1, wherein:
a ratio A/H of a vertical distance A measured in the tire radial direction from a ground contact edge position of the tread portion to the raised portion, to a tire cross-sectional height H is from 0.15 to 0.23.

6. The pneumatic tire according to claim 1, wherein the raised portion forms an L-shape.

7. The pneumatic tire according to claim 1, wherein a distance ratio L1/L2 is in a range of 0.5 to 0.8, where L1 is a vertical distance from the ground contact edge to the one portion of the pair of protruding portions closer to the ground contact edge, and L2 is a vertical distance from the ground contact edge to the another protruding portion of the pair of protruding portions farther from the ground contact edge.

8. The pneumatic tire according to claim 1, further comprising a recess in the raised portion, the recess extending outward in the tire radial direction from a radially inward edge of the raised portion.

* * * * *